Aug. 18, 1959     O. RŮŽIČKA     2,900,523
PHOTOCOLORIMETRIC DEVICE
Filed Sept. 6, 1956
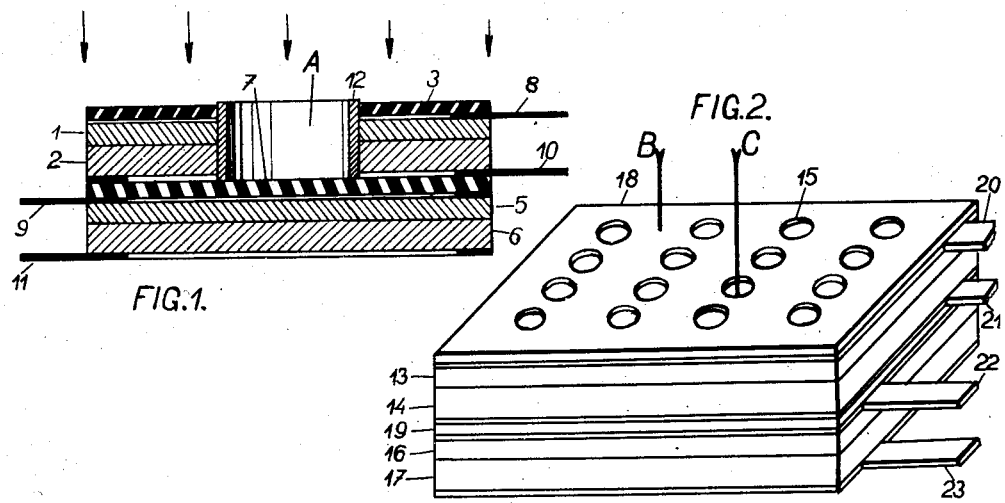
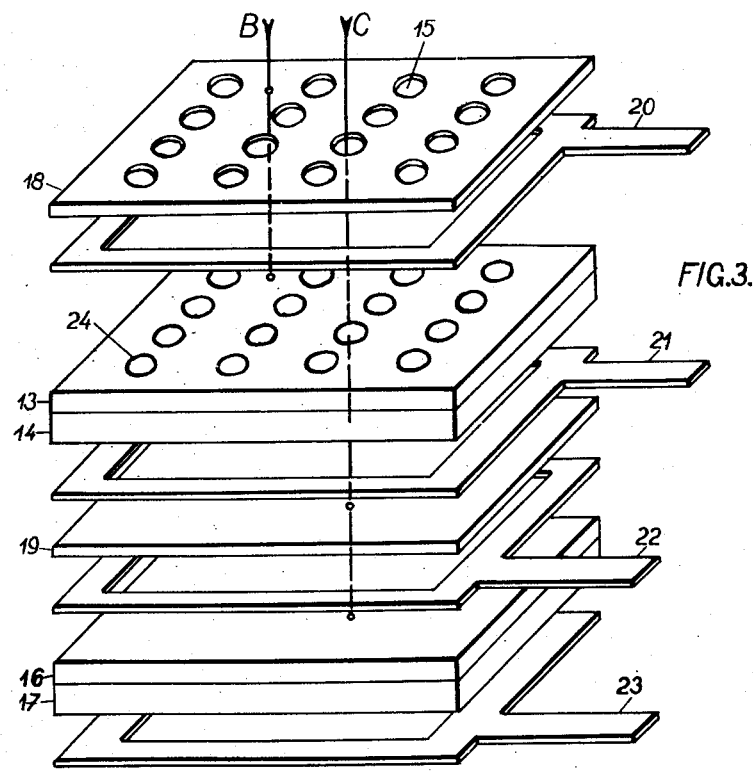
INVENTOR:
Otakar Růžička
BY: Michael S. Striker
Agt.

United States Patent Office 2,900,523
Patented Aug. 18, 1959

2,900,523

PHOTOCOLORIMETRIC DEVICE

Otakar Růžička, Prague, Czechoslovakia

Application September 6, 1956, Serial No. 608,305

Claims priority, application Czechoslovakia
September 16, 1955

6 Claims. (Cl. 250—211)

The present invention relates to a photocolorimetric device for oximetric and similar apparatus for taking simultaneous measurements in two spectral regions, and more particularly to a photocolorimetric device in which two electric photocells are illuminated by the same source of light. In the hitherto known photocolorimetric devices such as those which are used in the form of ear-units in the so called oximeters for an indication of changes in the percentage of oxygen saturation of blood in intact living tissues ("in vivo"), a selenium photocell is divided into three independent elements by two slots, passing through the entire thickness of its cathode layer. In this way three independent photoelectric elements with a common anode are obtained. The individual photoelectric elements are covered with suitable light filters. The central element has the smallest surface area and serves for measurements in the red spectral region, whereas the two lateral elements are electrically connected in parallel and have a considerably larger surface area and serve for measuring radiation in the near infrared region. Measurements in both spectral regions are carried out either independently from each other, or preferably simultaneously and also in mutual interdependence by the use of any suitable compensating circuit for the purpose of automatically compensating for the optical variations in the thickness of the layer.

The described arrangement suffers from numerous drawbacks. In the first place the manufacturing tolerances are rather exacting. The division of the photocell by two slots into three parts in an exact output ratio has to be carried out by a skilled worker individually on each single element. Due to the division of the cell, the output of the individual parts drops often out of proportion, which requires the indicating or recording apparatus to develop the highest degree of sensitivity of 10–10A. As the metallised contact strip for the cathode layer, arranged at the edge of the photocell, has to be divided by the slots, three contact strips, one for each area, result, but of different lengths, according to the different sizes of the respective areas, and it is therefore not always possible to achieve perfect and reliable contacts. After the slots have been made, the protective lacquer layer must be carefully restored or repaired and if this is not done well, the results of the measuring operation are affected by humidity, or the photocell may be even destroyed by incidentally penetrating mercury vapours which are deleterious even in traces. The common anode of all three parts of the photocell makes it impossible to use any electric compensating circuits of the oximeter other than those in which only anodes connected with each other are used.

According to the present invention the above mentioned drawbacks are avoided by superposing two different independent photocells, the upper cell allowing a portion of the light to fall on the lower cell.

The accompanying drawing represents two examples of preferred embodiments of the invention.

Fig. 1 shows a vertical section of a photocolorimetric unit with a single central aperture in the upper photocell.

Fig. 2 shows another arrangement of the photocolorimetric unit with a plurality of apertures in the upper photocell, and Fig. 3 shows in diagrammatic representation the passage of light rays through the elements of the photocolorimetric unit.

In the arrangement according to Fig. 1 the upper photocell with a first layer 1 and a second layer 2 is covered with an infra-red light filter 3 which serves for measurements in the range of wavelengths of about 800 millimicrons, having been made sensitive for this near infrared region. In the center of the cell a central aperture A is provided, said aperture being circular or having any other suitable shape and position. The size of the aperture amounts usually to about ⅕ of the operative surface of the photo-cell. Through this aperture A light falls on the lower photo-cell with the cathode 5 and anode 6 of usual range of sensitivity, carrying a red light filter 7. This lower cell is used for measurements within the range of wave-lengths of about 660 millimicrons.

Contact spring-rings 8, 9 for the cathodes 1 and 5 and rings 10, 11 for the anodes 2 and 6 are placed between the cells and the filters. The tubular inlay 12 in the aperture A of the upper photocell prevents illumination of the element with unfiltered light from the side. The entire system is mounted in a casing which, together with an illuminating device, represents the complete oximetric unit. By connecting the unit to indicating or recording instruments, oximetric devices of various types are obtained.

The advantages of the photocolorimetric device in the arrangement just described reside primarily in the increased light sensitivity and therefore in the smaller dimensions of the unit, while the requirements made on the indicating or recording instruments remain on the same level, and in the use of a considerably narrower beam of light in the measuring operation, which leads to increased accuracy of measurement. The manufacture is simple, using light filters and contact springs of standard size. The standard size of the contact springs assures the contacts to be free from failures. The division of the cathode layer, which is an exacting operation, is dispensed with and the separate anodes offer further possibilities of electric compensating circuits.

In the embodiment according to Fig. 2, the upper photoelectric cell 13, 14 is provided with apertures 15 in a way similar to a sieve, the lower photo-cells 16, 17 being illuminated through the said apertures. The apertures 15 in the photo-cell are circular and arranged as in a sieve, or they may show any other suitable regular or irregular shape and arrangement. The ratio of the effective surface areas of the apertures to the effective surface area of the sieve-like photocell is proportional to the specific absorptions of the living tissue for the wave lengths of the two spectral regions measured, and proportional to the different sensitivities of the two photocells for the lights of the corresponding spectral regions in question.

Both photocells 13, 14 and 16, 17 with the respective light filters 18 and 19, and contact springs 20, 21, 22, 23 are mounted in a flat casing. Fig. 3 shows diagrammatically the passage of light rays B, C through the individual elements of the unit.

The upper photocell is provided with a plurality of apertures 24, arranged facing each other so as to reduce the measuring error caused by the dimensioned irregularities of the tissue layer to a minimum, as will be explained below.

The chief advantage of the photocolorimetric device of the invention resides in the fact that the device may be manufactured in larger dimensions. It makes, therefore, considerably smaller demands on the sensitivity of the indicating or recording instruments, without, however, allowing the measuring error to become evident, said error being common to all hitherto known oximetric photocolorimetric units with juxtaposed photocells. The measuring error is due to the fact that the juxtaposed elements are illuminated from two different juxtaposed sections of the measured tissue layer. The morphological, and therefore also the optical irregularities, of the living tissue, such as differences in the size of blood-vessels and the like, cause irregular illumination of the photocells of conventional oximetric apparatus, whereby, the Lambert-Beer Law which, at best, applies only approximately to colorimetric determinations "in vivo," is no longer valid even in theory. The results are subject to a measuring error called, generally, "vessel error," which cannot be determined empirically or by calculation.

The hitherto known arrangements of photocolorimetric devices, suggested for the correction of this error, such as Taplin's, Saville's and Paul's arrangements are difficult to be carried out in practice because of the intricate optical parts involved which require much space. The same authors have also proposed an arrangement in which the photocell is divided into a plurality of strips or segments, so called "pie cell sections." The correction of the measuring error by this apparatus is imperfect and depends on the orientation of the strips or circular segments in respect to the irregularities of the layer to be measured which, in a living tissue, means particularly with respect to the course of the blood vessel. As the division of the cell has to be achieved by means of incisions, the sensitivity is reduced according to the statements of the authors by 28% for the strips and by 38% for the segments. Since the single cell is able to show maximum sensitivity only in one range of wavelengths, the sensitivity of the photocolorimetric unit as a whole is still further reduced and the demands made on the sensitivity of the indicating instruments are increased.

Variations and irregularities in the living tissues not only cause a measuring error in the known arrangements but also great instability of the measuring and indicating instrument, when the photoelectric cell is slightly moved on the tissue during the measurement. Various accessory devices have therefore been designed to hold the photoelectric cell in fixed position.

The sieve-like arrangement of the photocell according to the present invention substantially reduces the measuring error due to irregular illumination irrespective of the orientation of the photocell with respect to the irregularities of the measured layer.

The instability of the measuring instrument due to the same facts as the said measuring error and caused by movements of the unit on the tissue during the measurement, is also avoided by the sieve-like arrangement of the photocell according to the present invention. Holding devices for the unit are therefore not necessary. The sensitivity is higher than that of a single photocell of the same size, because it is increased by the combination of two photocells sensitive to different spectral ranges.

What is claimed is.

1. A photocolorimetric device for oximetric apparatus adapted to be illuminated from a single section of a tested translucent layer of tissue, the device comprising, in combination, a first photocell; a first filter superimposed on said first photocell and transmitting only a first continuous portion of the spectrum to said first photocell; a second photocell superimposed on said first filter and being formed with a plurality of openings passing therethrough; a plurality of opaque tubular elements respectively arranged in said openings and at least coextensive therewith; a second filter superimposed on said second photocell and being formed with a plurality of apertures respectively superimposed on said openings and coinciding with the same, said second filter transmitting only a second different continuous portion of the spectrum to said second photocell so that only said second portion of the spectrum impinges on and excites said second photocell, while light falling on said apertures passes through the same and through said openings onto said first filter whereby only said first portion of the spectrum impinges on and excites said first photocell; a first pair of terminal contacts attached to said first photocell; and a second pair of terminal contacts attached to said second photocell whereby across said first pair of terminal contacts a voltage is produced by said first photocell proportional to the intensity of said first portion of the spectrum, and whereby across said second pair of terminal contacts another voltage is produced by said second photocell proportional to the intensity of said second portion of the spectrum.

2. A photocolorimetric device for oximetric apparatus adapted to be illuminated from a single section of a tested translucent layer of tissue, the device comprising, in combination, a first photocell; a first filter superimposed on said first photocell and transmitting only a first continuous portion of the spectrum to said first photocell; a second photocell superimposed on said first filter and being formed with a plurality of openings passing therethrough; a plurality of opaque tubular elements respectively arranged in said openings and at least coextensive therewith; and a second filter superimposed on said second photocell and being formed with a plurality of apertures respectively superimposed on said openings and coinciding with the same, said second filter transmitting only a second different continuous portion of the spectrum to said second photocell, one of said continuous portions of the spectrum being near-infrared rays, and the other of said continuous portions of the spectrum being red rays so that only said second portion of the spectrum impinges on and excites said second photocell, while light falling on said apertures passes through the same and through said openings onto said first filter whereby only said first portion of the spectrum impinges on and excites said first photocell.

3. A photocolorimetric device for oximetric apparatus adapted to be illuminated from a single section of a tested translucent layer of tissue, the device comprising, in combination, a first photocell; a first filter superimposed on said first photocell and transmitting only a first continuous near-infrared portion of the spectrum to said first photocell; a second photocell superimposed on said first filter and being formed with a plurality of openings passing therethrough; a plurality of opaque tubular elements respectively arranged in said openings and at least coextensive therewith; a second filter superimposed on said second photocell and being formed with a plurality of apertures respectively superimposed on said openings and coinciding with the same, said second filter transmitting only a second continuous red portion of the spectrum to said second photocell so that only said second portion of the spectrum impinges on and excites said second photocell, while light falling on said apertures passes through the same and through said openings onto said first filter whereby only said first portion of the spectrum impinges on and excites said first photocell; a first pair of terminal contacts attached to said first photocell; and a second pair of terminal contacts attached to said second photocell whereby across said first pair of terminal contacts a voltage is produced by said first photocell proportional to the intensity of said first portion of the spectrum, and whereby across said second pair of terminal contacts another voltage is produced by said second photocell proportional to the intensity of said second portion of the spectrum.

4. A device as set forth in claim 3 wherein said first continuous near-infrared portion of the spectrum has a wavelength of approximately 660 millimicrons, and wherein said second continuous red portion of the spectrum has a wavelength of approximately 800 millimicrons.

5. A photocolorimetric device for oximetric apparatus adapted to be illuminated from a single section of a tested translucent layer of tissue, the device comprising, in combination, a first photocell; a first filter superimposed on said first photocell and transmitting only a first continuous portion of the spectrum to said first photocell; a second photocell superimposed on said first filter and being formed with a plurality of openings passing therethrough, said openings having an area of about one-fifth of the total area of said second photocell; a plurality of opaque tubular elements respectively arranged in said openings and at least coextensive therewith; a second filter superimposed on said second photocell and being formed with a plurality of apertures respectively superimposed on said openings and coinciding with the same, said apertures having the same area as said openings, said second filter transmitting only a second different continuous portion of the spectrum to said second photocell so that only said second portion of the spectrum impinges on and excites said second photocell, while light falling on said apertures passes through the same and through said openings onto said first filter whereby only said first portion of the spectrum impinges on and excites said first photocell; a first pair of terminal contacts attached to said first photocell; and a second pair of terminal contacts attached to said second photocell whereby across said first pair of terminal contacts a voltage is produced by said first photocell proportional to the intensity of said first portion of the spectrum, and whereby across said second pair of terminal contacts another voltage is produced by said second photocell proportional to the intensity of said second portion of the spectrum.

6. A photocolorimetric device comprising, in comprising, in combination, a first photocell; a first filter superimposed on said first photocell and transmitting only a first continuous portion of the spectrum to said first photocell; a second photocell superimposed on said first filter and being formed with at least one opening passing therethrough; a plurality of opaque tubular elements respectively arranged in said openings and at least coextensive therewith; a second filter superimposed on said second photocell and being formed with at least one aperture superimposed on said opening and coinciding with the same, said second filter transmitting only a second different continuous portion of the spectrum to said second photocell so that only said second portion of the spectrum impinges on and excites said second photocell, while light falling on said aperture passes through the same and through said opening onto said first filter whereby only said first portion of the spectrum impinges on and excites said first photocell; a first pair of terminal contacts attached to said first photocell; and a second pair of terminal contacts attached to said second photocell whereby across said first pair of terminal contacts a voltage is produced by said first photocell proportional to the intensity of said first portion of the spectrum, and whereby across said second pair of terminal contacts another voltage is produced by said second photocell proportional to the intensity of said second portion of the spectrum.

References Cited in the file of this patent

UNITED STATES PATENTS

| 2,732,469 | Palmer | Jan. 24, 1956 |
| 2,773,992 | Ullery | Dec. 11, 1956 |

FOREIGN PATENTS

| 563,774 | Great Britain | Aug. 29, 1944 |